United States Patent [19]

Schuller et al.

[11] 4,090,529

[45] May 23, 1978

[54] CLAPPER SEAL FOR CHECK VALVES

[76] Inventors: Ronald A. Schuller, 3634 S. Sandusky, Tulsa, Okla. 74135; Robert J. Glahn, 8527 E. 25th St., Apt. #1, Tulsa, Okla. 74129

[21] Appl. No.: 749,924

[22] Filed: Dec. 13, 1976

[51] Int. Cl.² ............................................. F16K 15/03
[52] U.S. Cl. ................... 137/516.29; 137/527
[58] Field of Search ................. 137/527, 527.2, 527.4, 137/527.6, 527.8, 516.25, 516.27, 516.29; 251/298, 299, 303, 358

[56] References Cited

U.S. PATENT DOCUMENTS

| 733,748 | 7/1903 | Rathbun | 137/527.4 X |
|---|---|---|---|
| 828,236 | 8/1906 | McElroy | 251/298 X |
| 1,505,958 | 8/1924 | Huntting | 137/527.2 |
| 2,482,198 | 9/1949 | Melichar | 137/527 |
| 2,767,735 | 10/1956 | Darling | 137/527 |

Primary Examiner—William R. Cline

[57] ABSTRACT

A check valve has a clapper pivotally mounted inside of a flow passage which clapper is formed by investment casting. The clapper of the check valve will only allow fluid flow in one direction. The face of the check valve has an annular groove formed therein and a recessed center portion. After a base surface is cut in the backside of the clapper, a molded rubber seal is formed on the face of the clapper with the seal extending from the annular groove with raised annular surfaces and a web covering the center portion. Upon receiving reverse flow through the check valve, the clapper will immediately close and seal against a valve surface. The raised annular surfaces deform into the annular recess therebetween allowing metal-to-metal contact between the clapper and valve surface, while simultaneously maintaining a good rubber seal contact.

6 Claims, 5 Drawing Figures

CLAPPER SEAL FOR CHECK VALVES

BACKGROUND OF THE INVENTION

The present invention relates to check valves and, more particularly, to clappers and clapper seals for check valves. The clapper is formed by investment casting thereby requiring only one cut for a base surface. Thereafter, a molded rubber seal is formed on the face of the clapper. The molded rubber seal has a raised annular portion and a complete web inside of the raised annular portion to prevent fluids from seeping behind the seal. The present invention is directed toward an improved clapper and seals for check valves as shown in U.S. Pat. No. 3,068,903, which patent is hereby incorporated by reference.

BRIEF DESCRIPTION OF THE PRIOR ART

Prior to the present invention, many different types of check valves having clappers and clapper seals have been devised. However, to prevent reverse fluid leakage around the clapper of the check valve at both low and high pressures, very expensive clappers and clapper seals had to be utilized. For example, in Frye (U.S. Pat. No. 3,348,569), the clapper had to be formed in two separate parts with the seal held therebetween having a postive gravity bias on the clapper.

Other prior art required smoothly machined surfaces on the clapper with the seal being held in the valve body. A typical such example is found in Scaramucci (U.S. Pat. No. 3,363,650); however, the clapper as shown in Scaramucci was expensive to manufacture and machine because of its curved sealing surface. Also, a separate sealing ring holding the sealing element required considerable machining, as well as the seating portion of the valve and the sealing portion of the clapper.

To overcome many of the problems of leakage around the clapper of a check valve, Scaramucci (U.S. Pat. No. 3,075,547) invented another seal arrangement for a clapper that seals both on a flat surface and a conical shaped surface. Such a seal required accurate machining of the conical shaped surface and the flat surface of the check valve body, plus accurate machining of the portion of the clapper holding the seal in position. The clapper also had to be very accurately suspended with respect to the machined surfaces of the check valve.

Haenky, et al. (U.S. Pat. No. 3,068,903), which has the same assignee as the present invention, shows a combination check and plug valve. The clapper portion of the valve has a seal contained in a groove in the face of the clapper. To aid in the compressability of the seal to give metal-to-metal contact, holes were formed along the center line of the seal as shown in FIGS. 9(a) and 9(b). In the prior patent issued to Haenky, et al., a problem of leakage at either low or high pressure frequently occurred. Many times the leakage was around the back of the seal, rather than between the seal and the seal surface. The present invention may be used to make an improved clapper and clapper seal for U.S. Pat. No. 3,068,903, the incorporated reference.

SUMMARY OF THE INVENTION

It is an object of the present invention to provide an improved clapper for check valves.

It is a further object of the present invention to provide a clapper for check valves having a seal with raised annular surfaces for sealing against the valve seat which seal has a web portion extending from the raised annular surfaces across the center surface of the clapper.

It is still another object of the present invention to provide an improved clapper for check valves with the improved clapper being formed from an investment casting.

By forming the clapper using investment casting, very accurate detail can be obtained for the clapper. By cutting a reference plane surface on the backside of the clapper, the clapper may be accurately positioned about a centering hole. Thereafter, a bonded rubber seal may be formed on the face of the clapper with reference to the centering hole and reference plane. Raised annular surfaces of a seal extend upward from an annular groove in the face of the clapper. A web portion of the seal extends from the raised annular surfaces to cover the center surface of the clapper. The seal is bonded directly to the clapper face.

DESCRIPTION OF THE PREFERRED EMBODIMENT

Figure 2:
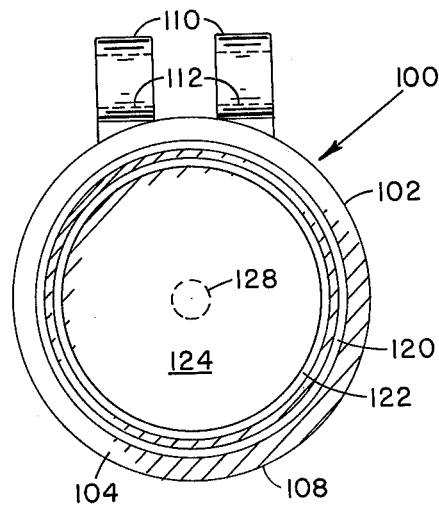
FIG. 2 is an elevated view of the clapper face.

Since U.S. Pat. No. 3,068,903 has been incorporated by reference, the description given hereinafter will be for a clapper that may be used in the incorporated reference. Some of the numerals previously used in the incorporated reference will be used herein. All new component parts referring to the clapper will begin with reference numeral 100, which reference numeral represents the clapper generally.

Figure 1:
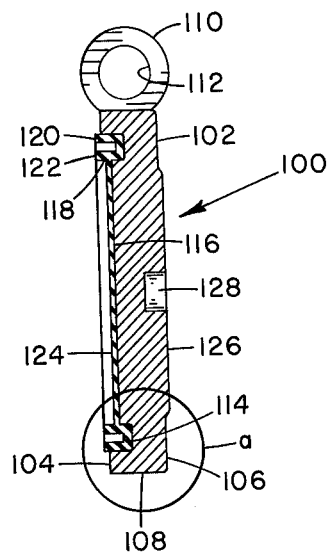
FIG. 1 is a cross sectional view of the clapper.

Referring to FIGS. 1 and 2 in combination, the clapper 100 has a generally flat circular body 102. The flat circular body 102 has a front face 104 and a rear surface 106. Extending outwardly from the edge 108 are mounting arms 110 with aligned holes 112 extending therethrough. The aligned holes 112 are adapted to receive pivot pin 25 of the combination valve 1 (see incorporated reference).

In the front face 104 of the clapper 100 is located an annular groove 114. The center surface 116 of front face 104 is recessed with respect to the front face 104. Located in the annular groove 104 is a seal 118. The seal 118 has a pair of spaced outwardly extending annular surfaces 120 and 122, both of which extend beyond the front face 104. A center web 124 is bonded to the center surface 116 and is formed integral with the entire seal 118.

The rear surface 106 of the clapper 100 has a slightly raised portion 126. In the center of the rear surface 106 is located a centering hold 128.

Figure 3:
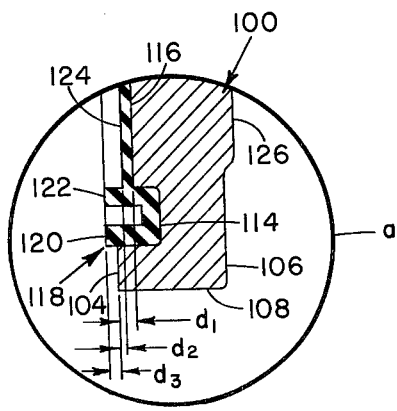
FIG. 3 is an enlarged view of the portion of FIG. 1 contained in circle "a".

Referring to the enlargement shown in FIG. 3, the construction of the face of the clapper 100 can be better understood. While it is obvious that the annular groove 114 extends into the flat circular body 102 considerably below the front face 104 and center surface 116, other dimensions may not be quite as obvious. For example, assuming that the front face 104 is the base plane, the distance from the plane formed by the front face 104 to the plane formed by the center surface 116 is distance $d_1$. The distance from the plane formed by the front face 104 to the outer surface of center web 124 is distance $d_2$, which is less than distance $d_1$. The distance from the plane formed by front face 104 to the outwardly extending annular surfaces 120 and 122 is distance $d_3$. It should be particularly noted that the center web 124 is recessed in the flat circular body 102 from the front face 104 by the distance $d_2$.

Figure 4:
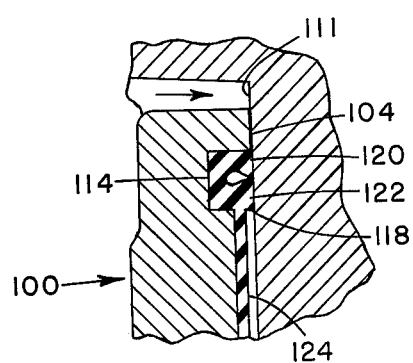
FIG. 4 is a partial sectional view of the clapper sealing against a valve seat.
Figure 5:
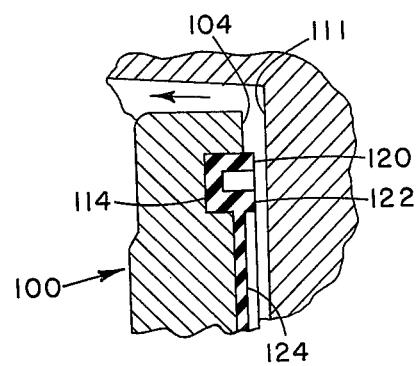
FIG. 5 is a partial sectional view of the clapper slightly raised off of a valve seat.

Referring now to FIG. 4, there is shown a partial sectional view of a clapper 100 mounted in the body 2 of the combination valve 1 of Haenky, et al (see incorporated reference). As the clapper 100 is pressed against the check valve seat 111 due to reverse pressure on the rear surface 106, the outwardly extending annular surfaces 120 and 122 deform inward into the space therebetween. Because of the center web 124 of the clapper 100, reverse pressure cannot cause fluid leakage between the rear of seal 118 and annular groove 114. Also, metal-to-metal contact exists between the check valve seat 111 and front face 104. Metal-to-metal contact is necessary to meet fire safety requirements. By deforming the outwardly extending annular surfaces 120 and 122 into the space therebetween, a constant positive force can be exerted on the clapper 100 by the plug 3 (shown in incorporated reference).

The center web 124 provides additional strength for the seal 118, and also provides abrasion resistance to fluid particles that may be flowing through the valve. Further, the center web does not allow any points of entry of fluid behind the seal 118.

METHOD OF MANUFACTURING

Clappers, as previously described in Haenky, et al., were formed by either forging, sand casting or dye casting. In any event, the uniformity of the dimensions of a clapper could only be insured by considerable machining of the alignment holes of the mounting arms and the front face of the clapper. In the present invention, the clapper is formed by investment casting (also called "lost wax casting") to obtain accurate cast detail for the clapper thereby requiring a minimum of machining. By forming clapper 100 using investment casting techniques not previously used in the manufacturing of check valves, only one surface needs to be accurately cut relative to the aligned holes 112. A flat surface is machined on the slightly raised portion 126 so that the flat surface is parallel to the axis of aligned holes 112.

By positioning the clapper 100 via the centering hole 128 on the machined, slightly raised portion 126, the seal 118 may now be formed. The seal 118 may be formed from any molded seal substance, such as rubber, on the front face 104 of clapper 100 in the position shown in the drawings. By forming the seal 118 from molded rubber, the only flashing that will occur will be minimal and will be around the outer edge adjacent front face 104. No trimming of the seal 118 is necessary prior to use of the clapper 100. The seal 118 is very accurately located with respect to the machined, slightly raised portion 26 and aligned holes 112. Once the molded rubber seal has hardened, the clapper 100 is ready for installation in a suitable valve, such as Haenky, et al.

We claim:
1. A metal clapper to prevent reverse flow in a metal check valve apparatus, comprising:
   a metal clapper having a continuous metal annular sealing surface for sealingly engaging a continuous metal annular sealing surface on a check valve apparatus;
   said metal clapper having a continuous annular groove therein adjacent and surrounded by the continuous metal sealing surface;
   a continuous web of resilient material bonded to the clapper within the space surrounded by the continuous metal annular sealing surface and extending into the annular groove to prevent any leakage around the annular groove;
   said central web being recessed from said annular sealing surface of said clapper;
   said central web having a raised annular seal formed of said resilient material and extending from said groove past the clapper annular sealing surface and deformably engageable with a check valve sealing surface upon engagement of the two metal sealing surfaces to prevent leakage around the annular groove and flow through the check valve apparatus in one direction.
2. The clapper as set forth in claim 1, wherein said annular seal has a pair of raised annular sealing surfaces.
3. The clapper as set forth in claim 2, wherein: said raised annular sealing surfaces have an annular recess therebetween to allow deformation of said pair of raised annular sealing surfaces upon engagement with a check sealing surface.
4. A metal check valve apparatus having a metal clapper to prevent reverse flow, comprising:
   a metal clapper having a continuous metal annular sealing surface for sealingly engaging a continuous metal annular sealing surface on the check valve apparatus;
   said metal clapper having a continuous annular groove therein adjacent and surrounded by the continuous metal sealing surface;
   a continuous center web of resilient material bonded to the clapper within the space surrounded by the continuous metal annular sealing surface and extending into the annular groove to prevent leakage around the annular groove;
   said central web being recessed from said annular sealing surface of said check valve apparatus;
   said central web having a raised annular seal formed of said resilient material and extending from said groove past the clapper annular sealing surface and deformably engageable with the check valve sealing surface upon engagement of the two metal sealing surfaces to prevent leakage around the annular groove and flow through the check valve apparatus in one direction.
5. The apparatus as set forth in claim 4 wherein said annular seal has a pair of raised annular sealing surfaces.
6. The apparatus as set forth in claim 5, wherein said raised annular sealing surfaces have an annular recess therebetween to allow deformation of said pair of raised annular sealing surfaces upon engagement with the check sealing surface.

* * * * *